US007661060B2

(12) United States Patent
Kim

(10) Patent No.: US 7,661,060 B2
(45) Date of Patent: Feb. 9, 2010

(54) MULTIMEDIA REPRODUCING APPARATUS AND METHOD

(75) Inventor: Tae-Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 10/457,444

(22) Filed: Jun. 10, 2003

(65) Prior Publication Data

US 2003/0229847 A1 Dec. 11, 2003

(30) Foreign Application Priority Data

Jun. 11, 2002 (KR) .................. 10-2002-0032556

(51) Int. Cl.
*G06F 17/00* (2006.01)
(52) U.S. Cl. .................. 715/203; 715/200; 715/201; 715/204; 715/234
(58) Field of Classification Search .............. 715/500.1, 715/501.1, 200–201, 203–204, 234
See application file for complete search history.

(56) References Cited

U.S. PATENT DOCUMENTS

| | | | | |
|---|---|---|---|---|
| 4,611,298 | A * | 9/1986 | Schuldt | 707/1 |
| 4,700,181 | A * | 10/1987 | Maine et al. | 345/539 |
| 5,777,612 | A * | 7/1998 | Kataoka | 715/500.1 |
| 6,580,756 | B1 * | 6/2003 | Matsui et al. | 375/240.08 |
| 6,654,030 | B1 * | 11/2003 | Hui | 715/720 |
| 6,795,092 | B1 * | 9/2004 | Nagai et al. | 715/716 |
| 2002/0097449 | A1 * | 7/2002 | Ishii | 358/452 |
| 2002/0129373 | A1 * | 9/2002 | Noda et al. | 725/90 |
| 2003/0028660 | A1 * | 2/2003 | Igawa et al. | 709/231 |
| 2003/0090711 | A1 * | 5/2003 | Yoshii et al. | 358/1.15 |
| 2003/0110277 | A1 * | 6/2003 | Cheng et al. | 709/231 |

FOREIGN PATENT DOCUMENTS

| | | |
|---|---|---|
| JP | 2001-285832 | 10/2001 |
| KR | 2001-0074365 | 4/2001 |
| KR | 2002-0023048 | 3/2002 |
| WO | WO 02/05089 | 1/2002 |

(Continued)

OTHER PUBLICATIONS

Kate, Warner ten, et al., "Timesheets—Integrating Timing in XML," The Ninth International World Wide Web Conference, Workshop: Multimedia on the Web, 2000, May 15, 2000, pp. 1-16.*

(Continued)

*Primary Examiner*—Laurie Ries
*Assistant Examiner*—Chau Nguyen
(74) *Attorney, Agent, or Firm*—KED & Associates, LLP

(57) ABSTRACT

An apparatus for controlling the reproduction of multimedia includes an input unit for receiving a SMIL document, a SMIL analyzer for analyzing the SMIL document and generating a DOM tree based thereon, a control table generator for generating a predetermined control table with reference to the DOM tree and a media reproducing unit for reproducing a media data of the SMIL document. The apparatus also includes a controller for controlling the media reproducing unit with reference to the control table. A method for controlling reproduction of multimedia also analyzes a SMIL document. Through the apparatus and method, the multimedia data is effectively controlled in a limited resource system in which a multi-processing is not supported.

28 Claims, 3 Drawing Sheets

FOREIGN PATENT DOCUMENTS

WO    WO 02/29602    4/2002

OTHER PUBLICATIONS

W3C, "Synchronized Multimedia integration Language Document Object Model, W3C Working Draft, Feb. 25, 2000," pp. 1-37.*

"X-Smiles .06 Technical Specifications," Apr. 26, 2002, pp. 1-25.*

Kim, Tae-Hyun, et al., "Simple and Consistent SMIL Authoring: No More Structure Editing and No More Errors," IEEE Symposium on Visual Languages (VL2000), workshop titled "Multimedia Computing on the World Wide Web," Sep. 14, 2000, pp. 1-8.*

W3C, "Synchronized Multimedia Integration Language (SMIL 2.0) Specification," W3C Working Draft 01, Mar. 1, 2001, Section 5, pp. 1-23, and Section 10, pp. 1-89.*

Kim, Tae-Hyun, et al., "Simple and Consistent SMIL Authoring: No More Structure Editing and No More Errors," IEEE Symposium on Visual Languages (VL2000), Satellite Workshop, Advance Program Session III: Markup Languages for the World Wide Web, workshop titled "Multimedia Computing on the World Wide Web," Sep. 14, 2000.*

W3C, "Synchronized Multimedia Integration Language (SMIL 2.0) Specification," W3C Working Draft 01, Mar. 1, 2001.*

"Synchronized Multimedia Integration Language (SMIL 2.0)," W3C Recommendation, dated Aug. 7, 2001.*

Cohen et al. "5. The SMIL 2.0 Layout Modules", Aug. 7, 2001, W3.ORG, pp. 1-31.*

Korean Office Action for Korean Patent Application No. 2002-32556, dated May 13, 2004 (English translation to follow).

Japanese Office Action dated Jul. 26, 2005.

http://www.glocom.ac.jp/wwvi/library/20010214/ipa-exhibit-panel.pdf; Remote Image Editing-Searching-Delivery Network Service System, Multimedia environment using SMIL, GLOCOM, International University of Japan, Matsushita Communication Industrial Co., Ltd, NTT Advanced Technology, and English-langugage translation; Feb. 14, 2001.

http://www.glocom.ac.jp/wwvi/library/20010214/remove-video.pdf; Ketsuke Kamimura, A networked system for editing, searching and delivering distributed video content English-language Abstract; Feb. 14, 2001.

* cited by examiner

FIG. 3A

| TIME(SECOND) | LIST OF MEDIA TO BE REPRODUCED |
|---|---|
| 0 | A.jpg |
| 1 | |
| 2 | |
| 3 | B.mp3 |
| 4 | |
| 5 | |
| 6 | C.gif , D.jpg |
| 7 | |
| 8 | |
| 9 | |

FIG. 3B

| TIME(SECOND) | LIST OF MEDIA TO BE STOPPED |
|---|---|
| 0 | |
| 1 | |
| 2 | |
| 3 | |
| 4 | |
| 5 | |
| 6 | A.jpg , B.mp3 |
| 7 | |
| 8 | |
| 9 | C.gif, D.jpg |

MULTIMEDIA REPRODUCING APPARATUS AND METHOD

BACKGROUND OF THE INVENTION

1. Field of the Invention

The present invention relates to controlling the reproduction of media information, and more particularly to an apparatus and method for reproducing multimedia on the basis of SMIL.

2. Background of the Related Art

Synchronized Multimedia Integration Language (SMIL) is a language which is used to temporally and spatially reproduce in terms of position, time, and/or other parameters extensible markup language (XML)-based multimedia, including text, images (e.g., bmp, jpg, png, gif), audio (e.g., wav, mp3) and/or video (e.g., mpeg). By connecting objects of multimedia data through a uniform resource locator (URL), SMIL not only provides a media stream but also a diverse number of services. For example, it may be used to transmit more information to users by dynamically providing diverse mediums together with an image. SMIL, pronounced "smile," has been developed by a group under World Wide WEB Consortium (W3C).

From a functional standpoint, SMIL is similar to Number Translation Markup Language (NTML) except that every tag is written in lower case and is XML-based. Using SMIL, Web site creators can easily define and synchronize expressions on the Web or multimedia factors for interaction such as video, sound or still images. In addition, mobile images, still images or sound on the Web can be transferred to users. Those factors, however, cannot interact with each other without elaborate programming.

SMIL helps to control reproduction time even though Web site creators separately send several pieces of movies, still images and sound. Objects of each media are accessed by a specific URL, which means that presentations can be made by objects reaching one or more URLs and the objects can easily be re-used in several presentations.

Accordingly, in the situation where XML has been established as a standard language for the next-generation Internet including the Web service, XML-based SMIL and its related techniques are expected to be used as a core technology to freely implement multimedia contents. A module defined with SMIL can also be used for existing HTML (Hypertext Markup Language) by an XHTML (Extensible Hypertext Markup Language) or a Markup language for a mobile Internet.

Hardware such as a general personal computer (PC) or a pocket PC having a digital signal processor (DSP) (or Central Processor Unit (CPU)) can independently process each media contained in an SMIL document. The hardware can individually process and output each media using a thread. However, there are drawbacks. Significantly, reproduction of a plurality of media in a limited resource system in which multi-process is not supported requires a multimedia control method or algorithm, which should be implemented after fully considering problems such as a processor burden or a reproduction performance degradation of the SMIL multimedia. These drawbacks make reproduction inefficient and therefore improvement is needed.

SUMMARY OF THE INVENTION

An object of the present invention is to provide a multimedia reproducing apparatus and method which smoothly reproduces various media of an SMIL document in a limited resource system such as a mobile communication terminal.

To achieve at least the above objects in whole or part, the present invention provides a multimedia reproducing apparatus including: an input unit for receiving a SMIL document; a SMIL analyzer for analyzing the inputted SMIL document and generating a DOM tree; a control table generator for generating a predetermined control table with reference to the DOM tree; a media reproducing unit for reproducing a media data of the SMIL document; and a controller for controlling the media reproducing unit with reference to the control table. Preferably, if there are multiple media to be reproduced, the media are aligned according a z-index alignment method and reproduction is made starting from a media of a lowest order. Preferably, the media of the control table has a connection structure of a linked list.

The present invention also provides a multimedia reproducing method including: receiving and analyzing an SMIL document and generating a DOM tree; generating a certain control table with reference to the DOM tree; driving a timer; and reproducing or stopping reproduction of media of the SMIL document with reference to the control table while the timer is driven. Preferably, the step of reproduction and stopping a media includes: checking the control table at every time sections; and reproducing a media if the media is at a corresponding time section of the control table, and stopping the media if the media is at a corresponding time section.

BRIEF DESCRIPTION OF THE DRAWINGS

FIG. 3A illustrates a reproduction control table in accordance with the preferred embodiment of the present invention; and FIG. 3B illustrates a stop control table in accordance with the preferred embodiment of the present invention.

DETAILED DESCRIPTION OF PREFERRED EMBODIMENTS

Figure 1:
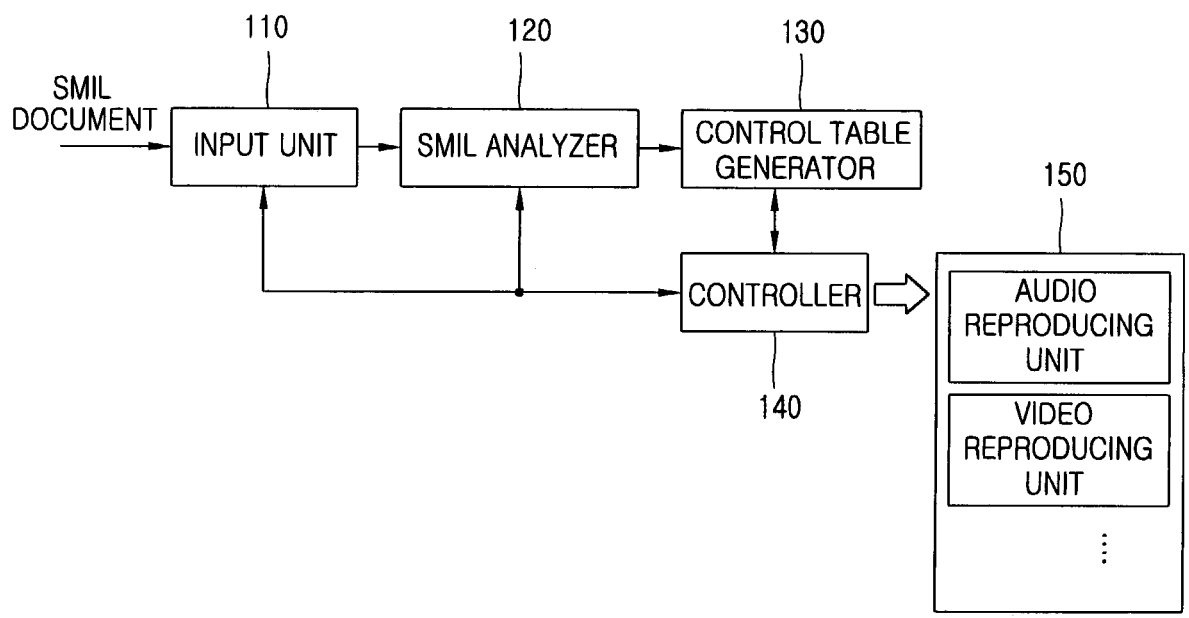
FIG. 1 is a schematic block diagram of a multimedia reproducing apparatus in accordance with a preferred embodiment of the present invention.

FIG. 1 is a schematic block diagram of a multimedia reproducing apparatus in accordance with a preferred embodiment of the present invention. The apparatus includes an input unit 110 for receiving an SMIL document, an SMIL analyzer 120 for analyzing the inputted SMIL document and generating a DOM tree, a control table generator 130 for generating a certain control table with reference to the DOM tree, and a media reproducing unit 150 for reproducing a media data of the SMIL document. The apparatus also includes a controller 140 for controlling the media reproducing unit 150 with reference to the control table. The media reproducing unit 150 preferably includes various types of media reproducers in order to reproduce diverse media data such as a text, an image (e.g., bmp, jpg, png, gif), an audio (e.g., wav, mp3), and a video (e.g., mpeg).

Figure 2:
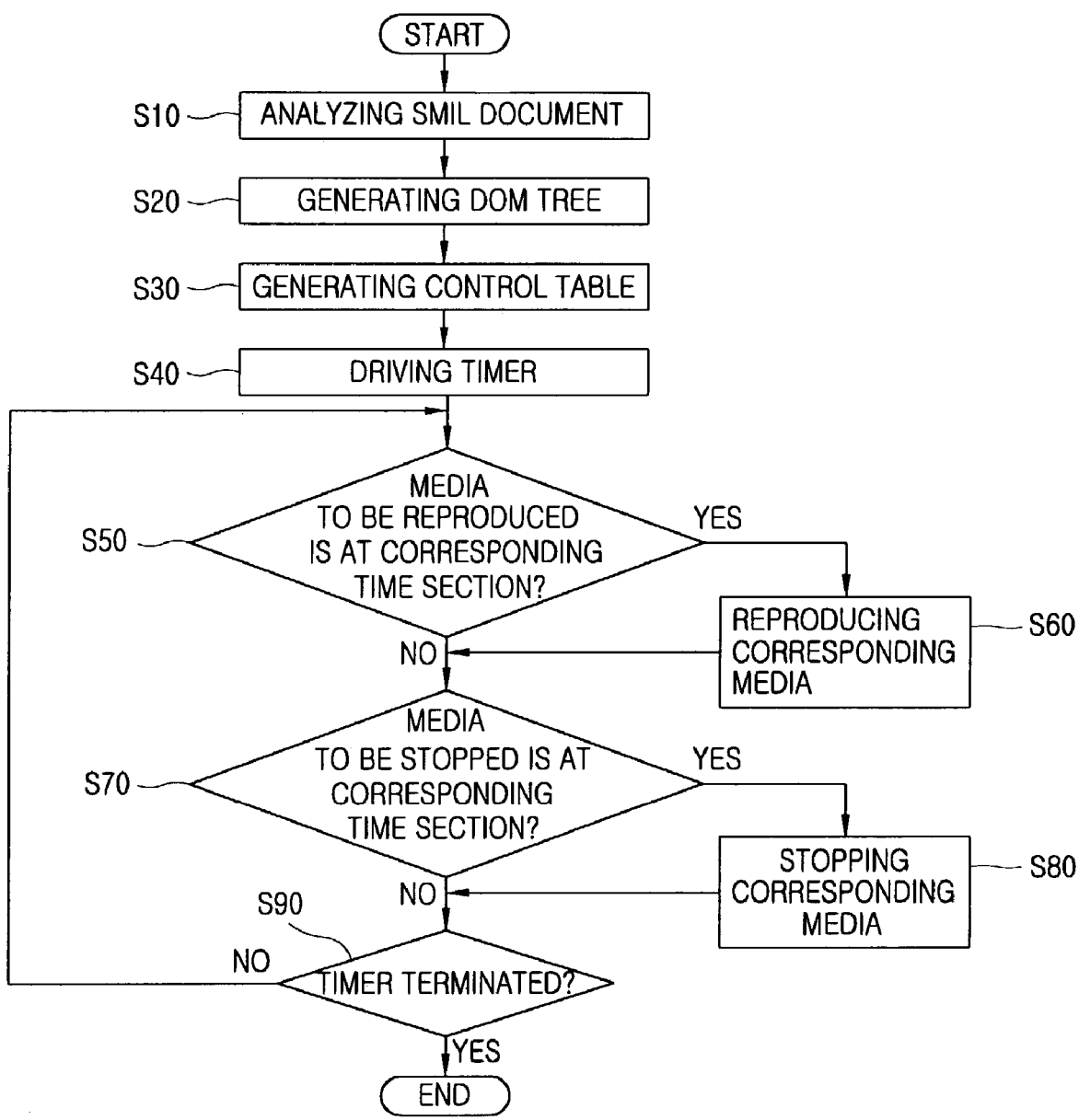
FIG. 2 is a flow chart of a multimedia reproducing method in accordance with the preferred embodiment of the present invention.

FIG. 2 is a flow chart of a multimedia reproducing method in accordance with the preferred embodiment of the present invention, FIG. 3A illustrates a reproduction control table in accordance with the preferred embodiment of the present invention, and FIG. 3B illustrates a stop control table in accordance with the preferred embodiment of the present invention.

As shown in FIG. 2, a multimedia reproducing method of the present invention includes receiving and analyzing a SMIL document and generating a DOM tree (steps S10 and S20), generating a certain control table with reference to the DOM tree (step S30), driving a timer (step S40), and reproducing or stopping media of the SMIL document with reference to the control table while the timer is driven (steps S50~S80). The media reproducing and stopping step (steps S50~S80) includes checking the control table at every or predetermined time sections (steps S50 and S70), reproducing a media if the media to be reproduced is at a corresponding time section of the control table (S60), and stopping a media if the media to be stopped is at a corresponding time section (step S80).

The operation and effect of the multimedia reproducing apparatus in accordance with the present invention will now be described with reference to FIGS. 1, 2, 3A and 3B. In order to reproduce media data of a SMIL document, reproduction time information and reproduction region information are basically required, and thus the SMIL document preferably includes these two kinds of information. Reproduction region information is indicated as 'region' and defines a coordinate value such as 'width' and 'height'. The reproduction time information defines 'begin', 'end' and 'duration'.

When the SMIL document is input into the input unit 110, a SMIL analyzer 120 analyzes the SMIL document and generates a DOM tree under the control of the controller 140. DOM (Document Object Model) is a programming interface standard developed by W3C, with which a programmer can make an HTML page or an XML document a program object. The DOM tree expresses a logical structure of the SMIL document in a tree form.

The control table generator 130 generates a control table with reference to the DOM tree. The control table consists of a reproduction control table and a stop control table (refer to FIGS. 3A and 3B). The reproduction control table defines a kind and name of a media to be reproduced at each time section. The stop control table defines a kind and name of a media to be stopped from reproduction at each time section. While FIGS. 3A and 3B show time expressed in seconds, those skilled in the art can appreciate that other time units may be used. The media respectively defined in the reproduction control table and stop control table preferably have a connection structure of a linked list. Accordingly, the control table can define as many media items or objects as desired without limitation in number. When the control table is generated, media of the SMIL document may store it in a memory (not shown).

Reproducing media or stopping reproduction of media of the SMIL document with reference to the control table will now be described.

First, controller 140 drives the timer and the controller checks whether there is a media to be reproduced or stopped from being reproduced at each time section with reference to the reproduction control table and stop control table (steps S50 and S70). If there is a media to be reproduced, the controller 140 loads the corresponding media data from the memory. If plural media data are loaded, the controller 140 aligns them according to, for example, a z-index and inputs them in a predetermined order to the media reproducing unit 150. The plural media may be input into the media reproducing unit 150 in turn starting from a media of the lowest order or in a different order. Upon receiving the media, the media reproducing unit reproduces them (step S60).

If there is a media to be stopped from reproducing, controller 140 instructs the media reproducing unit 150 to stop reproducing the corresponding media.

The above described media reproducing process (steps S50~S80) is repeatedly performed until the timer terminates. With the timer terminated, the controller 140 ends the media reproducing process (steps S50~S80).

The apparatus and method of the present invention for reproducing multimedia on the basis of SMIL therefore have at least the following advantages.

First, the multimedia data such as the SMIL document can be effectively controlled in a limited resource system which does not support a multi-processing.

Second, by associating each media defined in the control table with a connection structure of a linked list, each control table can define an unlimited number of media items or objects.

Third, the present invention can be applied to such a system as a personal digital assistant (PDA) or a mobile phone which does not support a high performance multi-processing.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile communication terminal to reproduce multimedia, the terminal comprising:
    an input unit that receives a Synchronized Multimedia Integration Language (SMIL) document at the mobile communication terminal;
    a SMIL analyzer that generates a Document Object Model (DOM) tree from the SMIL document;
    a control table generator that generates a predetermined control table based on the DOM tree;
    a media reproducing unit that reproduces media data of the SMIL document on the mobile communication terminal; and
    a controller that controls the media reproducing unit based on the predetermined control table,
    wherein the predetermined control table comprises a reproduction control table and a stop control table, the reproduction control table including a first plurality of time sections and a plurality of kinds or names of media to be reproduced at the corresponding first plurality of time sections, the stop control table including a second plurality of time sections and a plurality of kinds or names of media to be stopped from being reproduced at the corresponding second plurality of time sections, wherein each media specified in the predetermined control table has a connection structure of a linked list,
    wherein when there is a plurality of media items to be reproduced, the media reproducing unit aligns the media items according to a z-index alignment method and reproduces the media items starting from a media item having a lowest order under control of the controller,
    wherein the stop control table and the reproduction control table are separately operated, and
    wherein the controller arbitrarily adjusts a stop time of media being reproduced according to a user's input.

2. The terminal of claim 1, wherein the controller drives a timer and checks the control table at each of the first plurality of time sections and the second plurality of time sections, and wherein when there is media to be reproduced at a first time section specified in the reproduction control table, the controller reproduces the corresponding media and when there is media to be stopped from reproduction at a second time section specified in the stop control table, the controller stops reproducing of the corresponding media.

3. The terminal of claim 2, wherein the first time section and the second time section are a same time section.

4. The terminal of claim 1, wherein at least a portion of the first plurality of time sections and the second plurality of time sections are the same time sections.

5. A multimedia reproducing method in a mobile communication terminal comprising:
   generating a Document Object Model (DOM) tree from an Synchronized Multimedia Integration Language (SMIL) document at the mobile communication terminal;
   generating a control table with reference to the DOM tree, the control table comprising a reproduction control table that includes a first plurality of time sections and a plurality of kinds or names of media to be reproduced at the corresponding first plurality of time sections and a stop control table that includes a second plurality of time sections and a plurality of kinds or names of media to be stopped from reproducing at the corresponding second plurality of time sections, wherein each of the media in the reproduction control table and the stop control table have a connection structure of a linked list;
   starting a timer running; and
   reproducing or stopping reproduction of media items of the SMIL document on the mobile communication terminal based on the reproduction control table and the stop control table while the timer is running, and wherein when there are a plurality of media items to be reproduced, the reproducing includes aligning the media items according to a z-index alignment method and reproducing the media items starting from a media item having a lowest order,
   wherein the stop control table and the reproduction control table are separately operated, and
   wherein a controller arbitrarily adjusts a stop time of media being reproduced according to a user's input.

6. The method of claim 5, wherein the reproducing comprises:
   checking the control table at each of the first plurality of time sections and the second plurality of time sections; and
   reproducing at least one media item when the media item corresponds to one of the first plurality of time sections of the control table.

7. The method of claim 5, wherein the stopping reproduction comprises:
   checking the stop control table at each of the second plurality of time sections; and
   stopping a media item when the media item corresponds to one of the second plurality of time sections specified in the stop control table.

8. The method of claim 5, wherein at least a portion of the first plurality of time sections equals time sections in the second plurality of time sections.

9. A method for controlling reproduction of media information in a mobile communication terminal, comprising:
   identifying a plurality of media items specified in a Synchronized Multimedia Integration Language (SMIL) document at the mobile communication terminal;
   generating a table that associates each of the plurality of media items with a time, the table comprising a reproduction control table that lists times when each of a plurality of first ones of the media items are to be reproduced and a stop control table that lists times when reproduction of each of a plurality of second ones of the media items are to be stopped, and wherein each media item in the table has a connection structure of a linked list; and
   controlling reproduction of the plurality of media items on the mobile communication terminal based on the table, wherein when there are a plurality of media items to be reproduced, the media items are aligned according to a z-index alignment method and the media items are reproduced starting from a media item having a lowest order,
   wherein the stop control table and the reproduction control table are separately operated, and
   wherein a controller arbitrarily adjusts a stop time of media being reproduced according to a user's input.

10. The method of claim 9, wherein the identifying includes generating a logical representation of the plurality of media items specified in the SMIL document.

11. The method of claim 10, wherein the SMIL document includes reproduction time information indicating at least one of a start time, an end time, and a duration of the plurality of media items, and said logical representation is generated based on the reproduction time information.

12. The method of claim 11, wherein the SMIL document includes reproduction region information indicating positions where the plurality of media items are to be reproduced on a display screen.

13. The method of claim 11, wherein the SMIL document includes reproduction region information indicating sizes of the plurality of media items to be reproduced on a display screen.

14. The method of claim 10, wherein the logical representation includes a tree structure.

15. The method of claim 9, wherein said time indicates a time when an associated one of the media items is to be reproduced.

16. The method of claim 9, wherein said time indicates a time when reproduction of an associated one of the media items is to be stopped.

17. The method of claim 9, wherein the first media item and the second media item are the same media item.

18. The method of claim 9, wherein the media items include different kinds of media.

19. A mobile communication terminal for controlling reproduction of media information, comprising:
   an analyzer that identifies a plurality of media items specified in a Synchronized Multimedia Integration Language (SMIL) document at the mobile communication terminal;
   a generator that generates a table that associates each of the plurality of media items with a time, the table comprising a reproduction control table that lists times when each of a plurality of first ones of the media items are to be reproduced and a stop control table that lists times when reproduction of each of a plurality of second ones of the media items are to be stopped, and wherein each media item in the table has a connection structure of a linked list; and
   a controller that controls reproduction of the plurality of media items on the mobile communication terminal based on the table, wherein when there are a plurality of media items to be reproduced, the media items are aligned according to a z-index alignment method and the media items are reproduced starting from a media item having a lowest order under control of the controller, wherein the stop control table and the reproduction control table are separately operated, and wherein the controller arbitrarily adjusts a stop time of media being reproduced according to a user's input.

20. The terminal of claim 19, wherein the analyzer generates a logical representation of the plurality of media items specified in the SMIL document.

21. The terminal of claim 20, wherein the SMIL document includes reproduction time information indicating at least one of a start time, an end time, and a duration of the plurality of media items, said analyzer generates said logical representation based on the reproduction time information.

22. The terminal of claim 21, wherein the SMIL document includes reproduction region information indicating positions where the plurality of media items are to be reproduced on a display screen.

23. The terminal of claim 21, wherein the SMIL document includes reproduction region information indicating sizes of the plurality of media items to be reproduced on a display screen.

24. The terminal of claim 20, wherein the logical representation includes a tree structure.

25. The terminal of claim 19, wherein said time indicates a time when an associated one of the media items is to be reproduced.

26. The terminal of claim 19, wherein said time indicates a time when reproduction of an associated one of the media items is to be stopped.

27. The terminal of claim 19, wherein the first media item and the second media item are the same media item.

28. The terminal of claim 19, wherein the media items include different kinds of media.

* * * * *